United States Patent [19]
Ozeki

[11] 4,392,712
[45] Jul. 12, 1983

[54] LIGHT DISTRIBUTOR

[75] Inventor: Takeshi Ozeki, Tokyo, Japan

[73] Assignee: Tokyo Shibaura Electric Co., Ltd., Kawasaki, Japan

[21] Appl. No.: 201,987

[22] Filed: Oct. 29, 1980

Related U.S. Application Data

[63] Continuation of Ser. No. 888,358, Mar. 20, 1978, abandoned.

[30] Foreign Application Priority Data

Mar. 23, 1977 [JP] Japan .................................. 52-31032
Apr. 8, 1977 [JP] Japan .................................. 52-39552

[51] Int. Cl.³ .............................................. G02B 5/172
[52] U.S. Cl. .............................. 350/96.16; 350/96.15
[58] Field of Search ........................... 350/96.15, 96.16

[56] References Cited

U.S. PATENT DOCUMENTS 4,008,061  2/1977  Ramsay ...................... 350/96.15 X
4,054,366 10/1977  Barnoski et al. .............. 350/96.15

FOREIGN PATENT DOCUMENTS 2274053  1/1976  France ........................ 350/96.15
50-39403  7/1974  Japan .......................... 350/96.15
52-63349 11/1977  Japan .......................... 350/96.15
575126   4/1976  Switzerland ................... 350/96.15

OTHER PUBLICATIONS

Kawasaki et al., "Low-Loss Access Coupler for Multimode . . . ," *Appl. Optics*, vol. 16, No. 7, Jul. 1977, pp. 1794–1795.
Ozeki et al., "Optical Directional Coupler Using Tapered Sections . . . ," *Appl. Phys. Lett.*, vol. 28, No. 9, May 1976, pp. 528–529.
Ozeki et al., "New Star Coupler Compatible with Single Multimode Fiber Data Link," *Electr. Lett.*, vol. 12, Mar. 1976, pp. 151–152.
Hudson et al., "The Star Coupler: a Unique Interconnection . . . ," *Appl. Optics*, vol. 11, No. 13, Nov. 1974, pp. 2540–2545.

*Primary Examiner*—John D. Lee
*Attorney, Agent, or Firm*—Oblon, Fisher, Spivak, McClelland & Maier

[57] ABSTRACT

A light distributor comprising a plurality of optical fibers each having a tapered portion, said tapered portions of the optical fibers being thermally fused together to form a light mixing section where the cores of the fibers are packed together in a single cladding.

7 Claims, 16 Drawing Figures

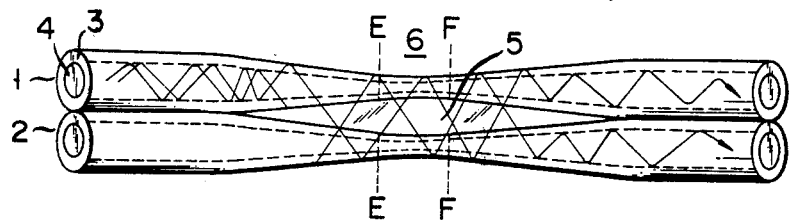
FIG. 1A (PRIOR ART)
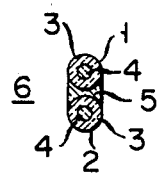
FIG. 1B (PRIOR ART)
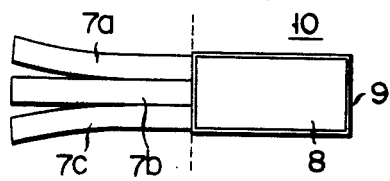
FIG. 2A (PRIOR ART)
FIG. 2B (PRIOR ART)
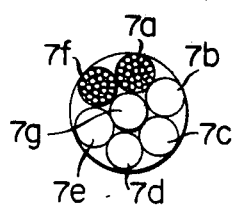
FIG. 4A 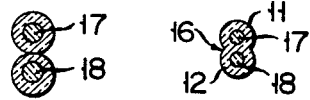 FIG. 4B 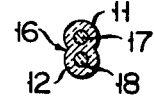 FIG. 4C 
FIG. 3
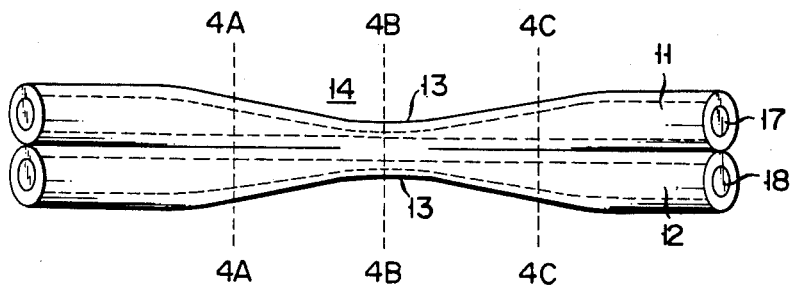
FIG. 5
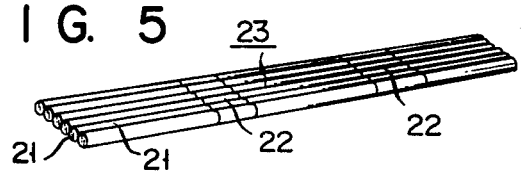

LIGHT DISTRIBUTOR

This is a continuation of application Ser. No. 888,358, 3/20/78, now abandoned.

This invention relates to a light distributor and particularly to a light distributor which distributes an optical signal from an optical fiber to other optical fibers with a small loss of input optical energy.

There is known an optical communication system in which electric signals are converted into optical signals and the optical signals thus obtained are transmitted from one station to another through optical fibers. In such an optical communication system it is usually necessary to transmit an optical signal from one station to a plurality of stations. More precisely, it is necessary to distribute an optical signal from a single optical fiber to a plurality of optical fibers. To achieve this a light distributor is used.

Various types of light distributors are well known. One of them comprises optical fibers as shown in FIG. 1A. The optical fibers 1 and 2 are each constituted by a cladding 3 and a core 4. A portion of each optical fiber is heated and elongated to form a biconically tapered waist 6. The fibers 1 and 2 are put together so that their waists 6 are arranged parallel to each other. Then, as shown in FIG. 1B, the gap between the waists 6 is filled with an optical adhesive agent 5. In this way the waists 6 of the fibers 1 and 2 constitute the light distributing section.

From the waists 6 of the light distributor thus formed, optical signals can be taken out effectively. However, the optical signals are partly absorbed by the adhesive agent 5 between the claddings 3 as they pass through the adhesive agent 5. The optical signals are therefore distributed with an inevitable loss. Further, the irregular surface of the agent 5 is liable to scatter the optical signals, resulting in a loss of optical signals, too. To make the surface of the agent 5 smooth enough, the agent 5 should be applied under conditions so strict that the light distributor cannot be manufactured on a large scale at a low cost.

Preferably, the optical adhesive agent 5 exists only in the light mixing region between E—E and line F—F in FIG. 1A. A light beam comes to have a cut-off mode in the first taper sections of the fibers 1 and 2. This light beam propagates through a so-called uncladded fiber which consists of an optical fiber and the external medium (i.e., air, here). The light spreads in the whole area of the light mixing region including the optical fibers 1 and 2. In theory, the second taper sections of the fibers 1 and 2 are spaced mutually and receive the light which spreads in the light mixing region to have a propagation mode, and the amount of light incident to each fiber is proportional to the cross sectional area of the fiber. Practically, however, the light mixing region is as narrow as a few hundred microns, and it is difficult to apply the optical adhesive agent 5 on such a narrow light mixing region only and to let it solidify there.

Moreover, as illustrated in FIG. 1B, the percentage at which the scattering light in the light mixing region illuminates the surface of the second (i.e. output) taper sections is reduced proportionally to the cross section area of the optical adhesive agent 5. As a result, the so-called packing fraction loss is increased. Namely, the optical signals incident to the surfaces of the fibers 1 and 2, excluding the mutually facing surface portions, cannot be converted to the guided modes of the output port fibers thus resulting in a large loss of optical signals.

Another known light distributor is star-shaped as shown in FIGS. 2A and 2B. This light distributor comprises a number of optical fibers 7a to 7g which are packed to form a hexagonal-close-pack configuration. The cables 7a to 7g have their ends put together and covered with a core glass 8, which is in turn coated with a reflection film or a cladding glass film 9 which constitute a mixing section 10.

An optical signal incident to, for example, the cable 7a propagates toward the end of the core glass 8 through a light mixing section 10 defined by the core glass 8. In the light mixing section 10 the light spreads in all directions and the scattered light is reflected upon the reflection film 9. Then the reflected light propagates through all the cables 7a to 7g in the opposite direction and finally illuminates the end faces of the cables 7a to 7g. In this way, an optical signal supplied to one of the cables 7a to 7g is distributed to all the cables 7a to 7g. Data transfer is therefore possible among the optical cables 7a to 7g which are arranged in a star pattern as viewed in the axial direction of the light distributor.

Each optical cable is a bundle of several to few hundred fine optical fibers. One of the optical fibers serves to transmit an optical signal. The packing fraction (i.e. ratio at which the optical fiber cores occupy the cross sectional area of the optical cable) is as small as 0.3. This means that the optical cables 7a to 7g, have a low light propagation efficiency. Since only the light captured by the core portions can propagate with low attenuatiion, the packing fraction ratio limits the minimum insertion loss of the star coupler shown in FIGS. 2A and 2B. Since the core glass 8 is made homogeneous, an optical signal supplied to, for example, the cable 7a is distributed to the other cables 7b to 7g but not equally. In other words, the amount of light distributed to one cable differs very much from that of light distributed to another. In particular, the central cable 7g receives very little light in comparison with the cables 7b to 7f.

Further, a large loss of input optical signals takes place at the position where the optical cables 7a to 7g meet the light mixing section 10. To reduce this loss, it is necessary to arrange the cables 7a to 7g as much parallel as possible to the axis of the light mixing section 10 in case the cables 7a to 7g are of small numerical aperture. In addition, when the end reflector is tilted from the plane perpendicular to the axis, it is impossible for the optical cables 7a to 7g to catch all the reflected light beams, thus reducing the light transmission efficiency of the light distributor.

An object of this invention is to provide a light distributor which can distribute optical signals with a small loss of input optical energy.

Another object of this invention is to provide a light distributor of so simple a construction that it can be manufactured easily and on a large scale.

Still another object of this invention is to provide alight distributor in which the difference in the amount of distributed light among optical fibers is reduced.

Namely this invention provides a light distributor comprising a plurality of optical fibers each having a tapered portion, said tapered portions of the optical fibers being thermally fused together to form a light mixing section where the cores of the optical fibers are packed together in a single cladding.

This invention can be more fully understood from the following detailed description when taken in conjunction with the accompanying drawing, in which:

FIGS. 1A and 1B are side and cross-sectional views, respectively, of a prior art light distributor;

FIGS. 2A and 2B are side and cross-sectional views, respectively, of another prior art light distributor;

FIG. 3 is a perspective view of a light distributor according to this invention;

FIGS. 4A, 4B and 4C are cross-sectional views of the light distributor shown in FIG. 3, taken along line 4A—4A, line 4B—4B and line 4C—4C, respectively;

FIG. 5 illustrates how to manufacture the light distributor shown in FIG. 3;

Figure 6:
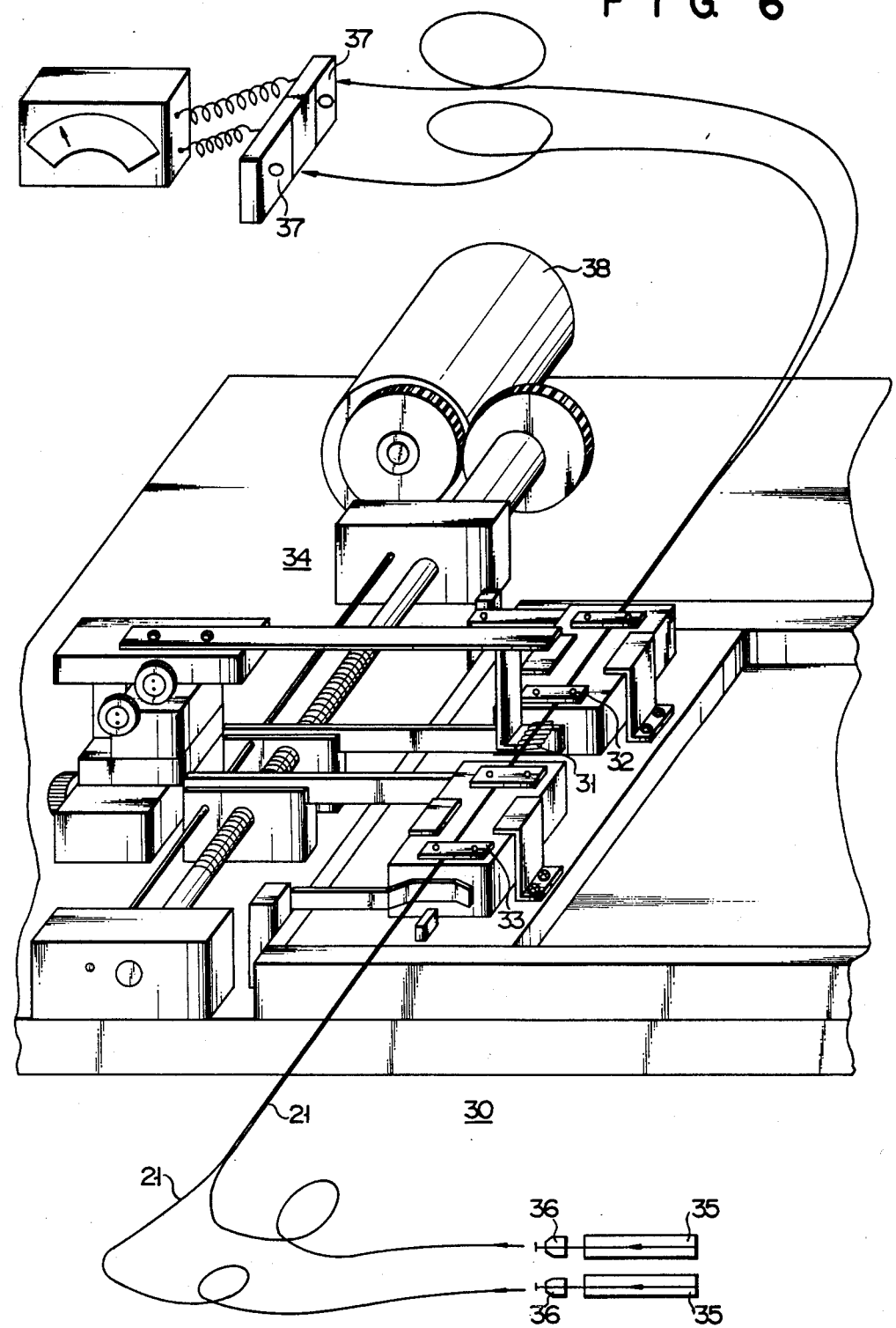
FIG. 6 shows an apparatus for forming the biconically tapered waists of the optical fibers of the light distributor illustrated in FIG. 3.

As shown in FIG. 3, one embodiment of this invention comprises two optical fibers 11 and 12 each having a biconically tapered waist 13. The optical fibers 11 and 12 are made of quartz glass or a multi-component glass such as modified soda lime silicate. The waists 13 of the fibers 11 and 12 are fused thermally, thus forming a light mixing section 14. Thus, as shown in FIG. 4B, the light mixing section cores 17 and 18 of the fibers 11 and 12 are packed together in a single cladding 16. The cores 17 and 18 have a different refractive index from that of the cladding 16. Light incident to the optical fiber 11 or 12 undergoes a diffused reflection in the light mixing section 14.

The central portions of the waists 13 are fused together very closely as shown in FIG. 4B, and the waists 13 are fused together to less extent toward their ends as shown in FIGS. 4A and 4C. Instead, the waists 13 may be fused together all over their length to such extent as shown in FIG. 4B.

With reference to FIGS. 5 and 6 it will be described how to fuse the biconically tapered waists of optical fibers.

For example, eight optical fibers 21 made of soda lime silicate are washed with acetone. Then, five of these optical fibers 21 are juxtaposed and put in mutual contact as illustrated in FIG. 5. A quickly solidifying adhesive agent 22 is applied to glue the five optical fibers 21 at two positions. The portions 23 of the fibers 21 between the two glued positions will constitute a light distributing section. The juxtaposed and glued fibers 21 are then fed into such an apparatus 30 for manufacturing light distributors as shown in FIG. 6.

The apparatus 30 comprises a hollow cylindrical heater 31, clampers 32 to 33 each made of, for example, a silicon rubber plate, and runner 34 which is driven by a stepping motor. The optical fibers 21 are made to pass through the heater 31 and positioned so that the portions 23 of the fibers 21 are placed in the heater 31. Thereafter, the fibers 21 are clamped by the clampers 32 to 33 steadfastly. The fibers 21 are adjustably tightened straight by the runners 34.

To simplify the explanation, only two optical fibers are shown in FIG. 6. One set of fiber ends is coupled to light sources 35 via objectives 36. These light sources 35 may be light-emitting diodes, semiconductor laser devices or He-Ne laser devices. The other set of optical fiber ends is coupled to photoelectric detectors 37.

Thereafter, the portions 23 of the fibers are cleaned, using absorbent cotton impregnated with acetone, thus removing dust. The light sources 35 are then turned on to emit light, and both optical fibers 21 transmit the light to the photoelectric detector 37. This done, the heater 31 is turned on to start heating the portions 23 of the fibers 21. The heating is continued until the portions 23 are fused together. The photoelectric detector 37 can detect when the fusing of the portions begins because the light transmitted to it is reduced by, for instance, about 5% at the beginning of the fusing. Then, the two runners 34 start to move in opposite directions at 1 to 2 mm/sec to elongate the portions 23. The elongation of the portions 23 is continued until the difference in the output powers of the two ports detected by the detector 37 is reduced to 0.5 dB. In the case of fabricating a light distributor employing more than two fibers, the output powers of the two outermost fibers in the array are monitored to find the timing to stop elongation.

In the above-mentioned method, the portions 23 of the optical fibers 21 are made into such biconically tapered waists as shown in FIG. 3. These waists constitute a mixing zone of a light distributor about 20 mm long. Each light source 35 emits light to one end of each optical fiber, and the photoelectric detector 37 detects the amount of light transmitted to it. Thus, the light distribution characteristic of the light distributor is measured.

The apparatus shown in FIG. 6 is advantageous in that a plurality of optical fibers 21 can be heated and fused and, at the same time, can be elongated to form a biconically tapered fiber coupler. In the central portions of the waists, which are fused together, a plurality of cores are packed within a single cladding. The heater 31 is a coil of a nichrome wire having an elliptical cross section, the major and minor axes of which are, for example, 12 mm and 5 mm, respectively. The coil consists of 10 turns, for example. The heater 31 thus constituted is heated with, for instance, AC current of about 5A, 50 Hz.

Figure 9:
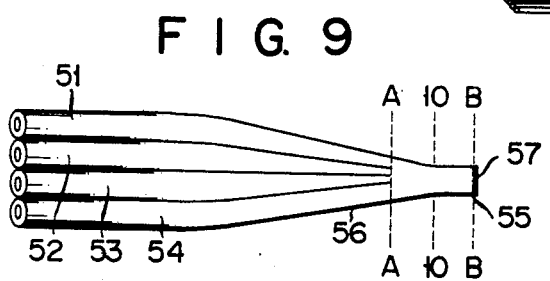
FIG. 9 shows another embodiment of this invention.

The light distributor shown in FIG. 3 is a so-called "transparent" or "unidirectional" type. With reference to FIG. 9, described is another embodiment of this invention which is a so-called "reflection" or "bidirectional" type.

Figure 10:
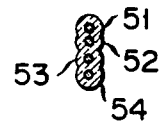
FIG. 10 is a cross-sectional view of the light distributor shown in FIG. 9, taken along line 10—10 in FIG. 9.

The light distributor of the reflection type shown in FIG. 9 comprises four optical fibers 51 to 54. Each optical fuber consists of a core which is, for example, 80 μm thick and a cladding which has an outer diameter of, for example, 120 μm. The fabrication proces of tapering employed in the reflection-type light distributor is the same as described previously related to the transparent-type light distributor, except that one of the runners 34 in FIG. 6 is removed so that the fibers are elongated only in one direction. The uni-directional elongation of the fibers provides tapers with smaller taper angles suitable in the use of reflection-type light distributor shown in FIG. 9. The biconically tapered fibers, of which their waists are fused together as shown in FIG. 10, are cut at the waists perpendicularly to the fiber axis.

It is possible to obtain a cleaved mirror end when the biconically tapered fibers are placed along a cylindrical surface having a radius of about 15 mm and applied with a tensile stress of about 150 g and scribed by a diamond blade. The other method of obtaining a mirror surface at the waist end is by polishing. The former method is used in the light distributor of which the characteristics are described later.

Figure 11:
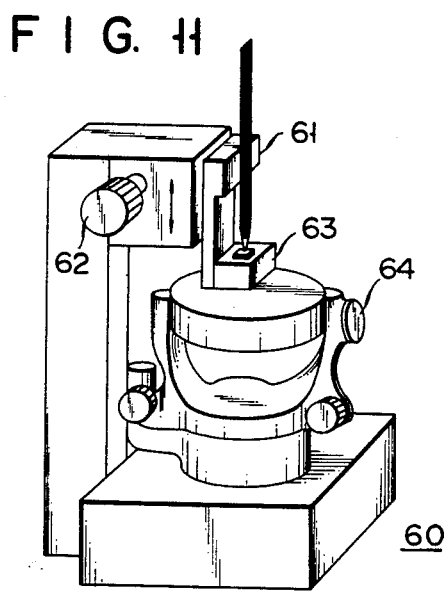
FIG. 11 shows an apparatus for forming the end reflector of the light distributor shown in FIG. 9.

There are two alternative methods for fabricating the reflection end 57 shown in FIG. 9. One is deposition of metal, such as gold and aluminum, which has high reflectivity at the wavelength used in the optical data distribution system. A pin hole mask is used to localize the deposition to the vicinity of the waist end, and an epoxy resin is coated to protect the deposition film. The other method is the use of a tiny metal-deposition mirror or a tiny dielectric multilayer coated mirror, with assistance of an apparatus 60 as illustrated in FIG. 11. The apparatus 60 comprises a fiber holder 61, a dial 62 for a vertical positioning, a mirror holding block 63, an azimuthal angle adjusting mechanism 64 and a dial (not shown) for horizontal rotation. The tapered fiber array with a cleaved end waist is glued on a fiber holder 61. A tiny mirror is placed on a mirror holder block 63. Under the observaton of a low-power microscope, the angles of the mirror relative to the fiber waist are adjusted so that the fiber array is placed perpendicularly to the mirror surface. The perpendicularity is easily monitored by a microscope to check the bend angle between the real fiber waist and its image. After removing the fiber end by turning the vertical position dial, an epoxy resin glue is placed in the thin film on the mirror. Then the fiber waist end is returned to be glued on the mirror. After curing the glue, the mirror holding block 63 is glued to the fiber holder 61.

Figure 7:
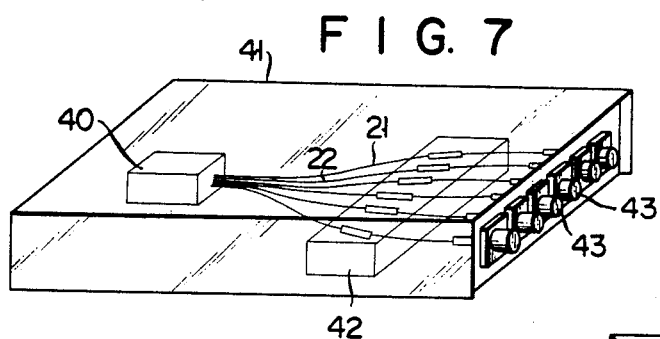
FIG. 7 shows the light distributor of FIG. 3 in the coupler configuration.
Figure 8:
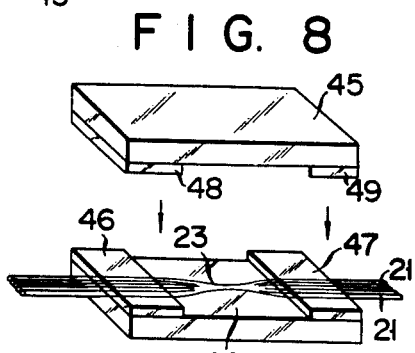
FIG. 8 is a perspective view of an optical fiber holder used in the light distributor shown in FIG. 7.

The light distributor shown in FIG. 9 may be incorporated into such a coupler configuration as illustrated in FIG. 7. The coupler comprises an optical fiber holder 40, a housing 41, a splice table 42 and optical connectors 43. The holder 40 is comprised of a pair of rectangular glass plates 44 and 45; a pair of glass support members 46 and 47 bonded to the rectangular glass plate 44 and spaced from each other; and a pair of glass support members 48 and 49 bonded to the rectangular glass plate 45 and spaced from each other. The optical fibers 21 are put on the support members 46 and 47 so that the biconically tapered waists 23 are positioned between the support members. Then, an adhesive agent is applied onto the support members 46, 47, and the rectangular glass plate 45 is glued to the rectangular glass plate 44 through the support members so that the light distributor is clamped steadfastly.

The holder 40 clamping the light distributing section 23 is secured on the bottom of the housing 41. On the splice table 42 the optical fibers 21 are juxtaposed at regular intervals. They are coupled to the corresponding optical connectors 43 which protrude from a side of the housing 41 and which are arranged side by side equidistantly.

The light distributor thus made and as shown in FIG. 9 has a light mixing section which lies between line A—A and line B—B and which is, for example, 5 mm long.

An optical signal, if supplied to the optical fiber 51, propagates through the tapered section to the fused mixing zone, which is the area between A—A and B—B in FIG. 9. The input light repeatedly undergoes a total reflection at the boundary between the fiber core and cladding in the isolated tapered fiber core. The angles of the bouncing light beams, with respect to the axis of the tapered fiber, become gradually larger as bouncing down the tapered section continues. At last, when the angles become larger than the critical angle of the total reflection, which is determined by the refractive indexes of fiber core and cladding, the light beams start to spread in the whole area including core and cladding of the fiber. These light beams are now supported by a so-called "un-cladded fiber". The outer medium of a lower refractive index (i.e. the air, here) confines the light beam in the glass fiber by total reflection. After the light beams reach the mixing zone, the light mixing is started. In the mixing zone, the refractive index profile is more complicated since a plurality of cores exist in a single cladding. This fact is one of the clear features that differs from the conventional mixer rod described previously. In the mixing zone, where the fiber claddings are fused together, the light beams repeatedly undergo a diffused reflection and refraction due to the complicated refractive index distribution of the mixing zone, so that the light intensity distribution in the mixing zone becomes uniform effectively. The light, i.e. mixture of light beams, propagates farther to the end reflector 57, is reflected thereupon, and propagates back to the mixing zone. In the light mixing zone the light repeatedly undergoes another diffused reflection and refraction. The light beams resulting from these diffused reflection and refraction are mixed to generate a uniform light intensity distribution, which is shared by the tapered ends of the optical fibers at a quite equal distribution ratio. Then, the light beams, which spread in the whole area of core and cladding at the expanding tapered end just outside the mixing zone, are reconverted into the beam guided in the core, after the light beams repeatedly undergo another total reflection through the isolated tapered fiber section.

Some light distributors employing tapered fibers with fused waist mixing zones, were made and tested. The ratio at which the light incident to one of the fibers was distributed to the remaining individual fibers was recorded as shown in the following Table 1. For example, the light supplied to the fiber 1 was distributed to the other fibers 2 to 8 in such ratio as indicated by numerical values in dB on the first row. The light distributor, of which power splitting ratios are listed in Table 1, is the reflection type tapered fiber light distributor with 8 ports. The light incident to one of the fiber ports is split into 8 ports, including said one port. The measurement of the splitting power shared by the incident port is quite difficult so that the power ratio $C_{ij}$ ($i=j$) is omitted.

TABLE 1

| $C_{ij}$ | | Output port | | | | | | |
|---|---|---|---|---|---|---|---|---|
| | | 1 | 2 | 3 | 4 | 5 | 6 | 7 | 8 |
| Input port | 1 | — | 11.1 | 12.0 | 12.2 | 12.6 | 12.6 | 12.7 | 12.4 |
| | 2 | 11.1 | — | 11.6 | 12.1 | 12.4 | 12.6 | 12.5 | 12.3 |
| | 3 | 12.1 | 11.8 | — | 11.8 | 12.5 | 12.9 | 12.9 | 12.5 |
| | 4 | 12.5 | 12.4 | 12.1 | — | 12.2 | 13.0 | 13.1 | 12.8 |
| | 5 | 12.9 | 12.8 | 12.6 | 12.1 | — | 12.1 | 12.7 | 12.5 |
| | 6 | 12.9 | 12.9 | 12.9 | 12.6 | 12.0 | — | 12.1 | 12.1 |
| | 7 | 12.8 | 12.7 | 12.8 | 12.8 | 12.4 | 12.2 | — | 11.4 |
| | 8 | 12.4 | 12.3 | 12.5 | 12.3 | 12.1 | 12.1 | 11.3 | — | all values in dB

Such conventional light distributors as shown in FIG. 2 but constituted by four optical fibers were tested to see at what ratio an input light supplied to one of the fibers was distributed to all the fibers. The results are as given in the following Table 2.

TABLE 2

|  |  | Output port | | | |
|---|---|---|---|---|---|
|  |  | 1' | 2' | 3' | 4' |
| Input port | 1 | 7.8 | 9.9 | 9.9 | 9.1 |
|  | 2 | 10.0 | 6.2 | 9.7 | 9.0 |
|  | 3 | 9.6 | 9.4 | 5.8 | 10.1 |
|  | 4 | 9.1 | 10.4 | 10.2 | 7.6 | all values in dB

Comparison between the data of Tables 1 and 2 clearly shows that the light distribution ratio of the light distributor according to this invention is well improved. Tables 1 and 2 further show that in the prior art light distributor as shown in FIG. 1, wherein the light mixing section is constituted by members of the same refractive index, the light beams resulting from the scattering of an input optical signal are too directional to be mixed in the light mixing section so thoroughly as desired.

Preferably, the light distributor as shown in FIG. 3 or FIG. 9 should have the tapered portions of the optical fibers coated with a reflection film of, for example, a gold or aluminum, using a vacuum deposition method. If coated on the tapered portions, the film will prevent the input light from leaking from the tapered portions.

Figure 12:
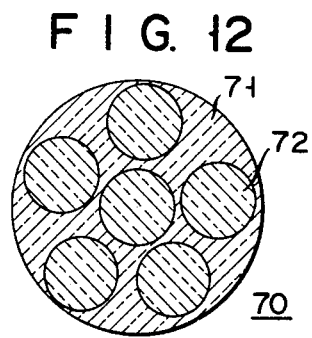
FIG. 12 is a cross-sectional view showing another embodiment of this invention.

In both embodiments of FIG. 3 and FIG. 9 the optical fibers are arranged on the same plane. Instead, they may be bundled together as shown in FIG. 12. To put it more precisely, the light mixing section 70 may have a circular cross section and may be constituted by a circular cladding 71 and cores 72 packed together within the cladding 71, arranged in a three dimensional relationship.

What is claimed is:

1. A light distibutor comprising a plurality of optical fibers with each of said optical fibers having a core located therein that is encapsulated by an individual cladding; said light distributor having a tapered light mixing section in which the cladding of adjacent optical fibers remain intact when said optical fibers, held firmly together in a juxtapositional relationship, are thermally fused together to form said tapered light mixing section, said optical fibers being subjected to tensile stresses during said thermal fusion; said optical fibers being thermally fused only in the region of said tapered light mixing section; whereby a light distributor is formed which distributes optical signals with a small loss of input optical energy.

2. A light distributor according to claim 1, wherein the cores of said optical fibers are so arranged within said cladding as to define a circuit when viewed in the axial direction of said tapered light mixing section.

3. A light distributor according to claim 1, wherein a reflection film is coated on the smaller end face of said tapered light mixing section.

4. A light distributor according to claim 3, wherein said reflection film is made of gold or aluminum.

5. A light distributor comprising a plurality of optical fibers with individual cladding and with each having a biconically tapered waist; said tapered waists of the optical fibers being thermally fused together to form a light mixing section, said optical fibers being subjected to tensile stresses during said thermal fusion, wherein the cores of the fibers are packed in a single cladding and each of the cores is individually retained in the single cladding; whereby a light distributor is formed which distributes optical signals with a small loss of input optical energy.

6. A light distributor comprising optical fibers at least one end of which is conically tapered; said tapered end portions of the optical fibers being thermally fused together to form a light mixing section wherein the cores of the fibers are packed in a single cladding and the end face of which is coated with a reflection film; said tapered end portions of the cores being separated from each other in the single cladding.

7. A light distributor comprising:
a plurality of optical fibers with individual cladding and with each having a biconically tapered waist; said tapered waists of the optical fibers being thermally fused together to form a light mixing section;
wherein the cores of the fibers are packed in a single cladding and each of the cores is individually retained in the single cladding;
whereby a light distributor is formed which distributes both higher order mode and lower order mode optical signals with a small loss of input optical energy.

* * * * *